United States Patent [19]

Moore

[11] Patent Number: 4,547,965

[45] Date of Patent: Oct. 22, 1985

[54] SYNCHRONIZED FOLDING KNIFE

[76] Inventor: Donald M. Moore, 1206 S. Mayflower, Arcadia, Calif. 91006

[21] Appl. No.: 581,177

[22] Filed: Feb. 17, 1984

Related U.S. Application Data

[63] Continuation of Ser. No. 369,162, Apr. 16, 1982, abandoned.

[51] Int. Cl.[4] ........................ B26B 1/10; B26B 29/02; F16N 21/44

[52] U.S. Cl. ........................................ 30/153; 30/173; 74/98

[58] Field of Search ........................ 30/173, 153; 74/98

[56] References Cited

U.S. PATENT DOCUMENTS

| | | | |
|---|---|---|---|
| 229,706 | 7/1880 | Jansen | 30/153 |
| 304,545 | 9/1884 | Newell | 74/98 |
| 881,294 | 3/1908 | Billings | 30/158 |
| 1,659,418 | 2/1928 | Werner | 30/153 |
| 1,665,955 | 4/1928 | Gatewood | 30/153 |
| 2,199,430 | 5/1940 | Greye | 30/160 |
| 2,714,249 | 8/1945 | Clark et al. | 30/153 |
| 4,330,937 | 5/1982 | Cope | 30/153 |

FOREIGN PATENT DOCUMENTS

| | | | |
|---|---|---|---|
| 1139350 | 6/1957 | France | 30/153 |

*Primary Examiner*—Robert L. Spruill
*Assistant Examiner*—Paul M. Heyrana, Sr.
*Attorney, Agent, or Firm*—Christie, Parker & Hale

[57] ABSTRACT

A folding knife having a blade and a pair of folding handles. The handles are channel shaped and bifurcated at one end for receiving one end of the blade. The bifurcated ends of the handles are attached to the blades by adjacent pivot pins. Rotation of the handles to the closed position encloses the blade inside the opposing channels of the handles. The ends of the handles are coupled by meshing gears pivoted on the same pins so that the handles must rotate together in opposite directions through 180° between closed and open positions.

2 Claims, 5 Drawing Figures

SYNCHRONIZED FOLDING KNIFE

This is a continuation of application Ser. No. 369,162 filed Apr. 16, 1982, now abandoned.

FIELD OF THE INVENTION

This invention relates to a knife with a folding handle, and more particularly, to a knife in which the handle is in two pivoted sections which fully enclose the blade when in the folded position.

BACKGROUND OF THE INVENTION

Folding knives are well-known having two handle segments that are pivotally attached to one end of a blade and which rotate in opposite directions between a closed position in which the handles fully enclose the blade to an open position in which they form an extended handle. See, for example, U.S. Pat. No. 229,706, No. 881,294, No. 1,665,955, and No. 274,249. In the knives shown in each of these prior art patents, the handle is in two sections which, in the operative position, extend parallel to each other and are pivotally joined at one end to one end of the knife blade. The two handle sections can be rotated in opposite directions away from each other through 180° to a closed position in which they fully enclose the blade of the knife. Optionally, some kind of latching arrangement holds the outer ends of the handle segments together when they are extended in the open position or rotated into the closed position. This arrangement requires that each of the handle sections be separately rotated through 180° between its opened and closed positions. Separately maneuvering the two handle sections between the two positions can be awkward and even hazardous. The maneuver usually requires the use of both hands to grasp each of the handle segments, and care must be taken to make sure that the fingers do not come in contact with the cutting edge of the blade in moving the handle segments into the closed position.

SUMMARY OF THE INVENTION

The present invention is directed to an improved folding knife of the type in which the handle is in two segments or sections which are pivotally secured to one end of the blade and rotate in opposite directions about separate axes between an open position and a closed position. The improved design of the present invention utilizes a pair of meshing gear sectors at the pivoted ends of the handles which rotate with the handle segments. The meshed gears link the handles together so that rotation of the handle sections is synchronized relative to the blade and the blade always bisects the angle formed between the two handle sections. This arrangment makes it easier for the operator to rotate the handles between the open and closed position. It also adds to the safety of the knife, since the blade is always maintained at equal angles with both handle sections. Another advantage is that the gears insure that the handle sections come together and contact each other to enclose the blade in the folded position without the knife edge coming in contact with a handle section. The gear sectors also provide a thumb or finger rest for certain cutting chores and help prevent the user's hands from slipping along the handle onto the blade during use.

DESCRIPTION OF THE DRAWINGS

For a better understanding of the invention, reference should be made to the accompanying drawings, wherein.

DETAILED DESCRIPTION

Figures 1, 2, 4, 5:
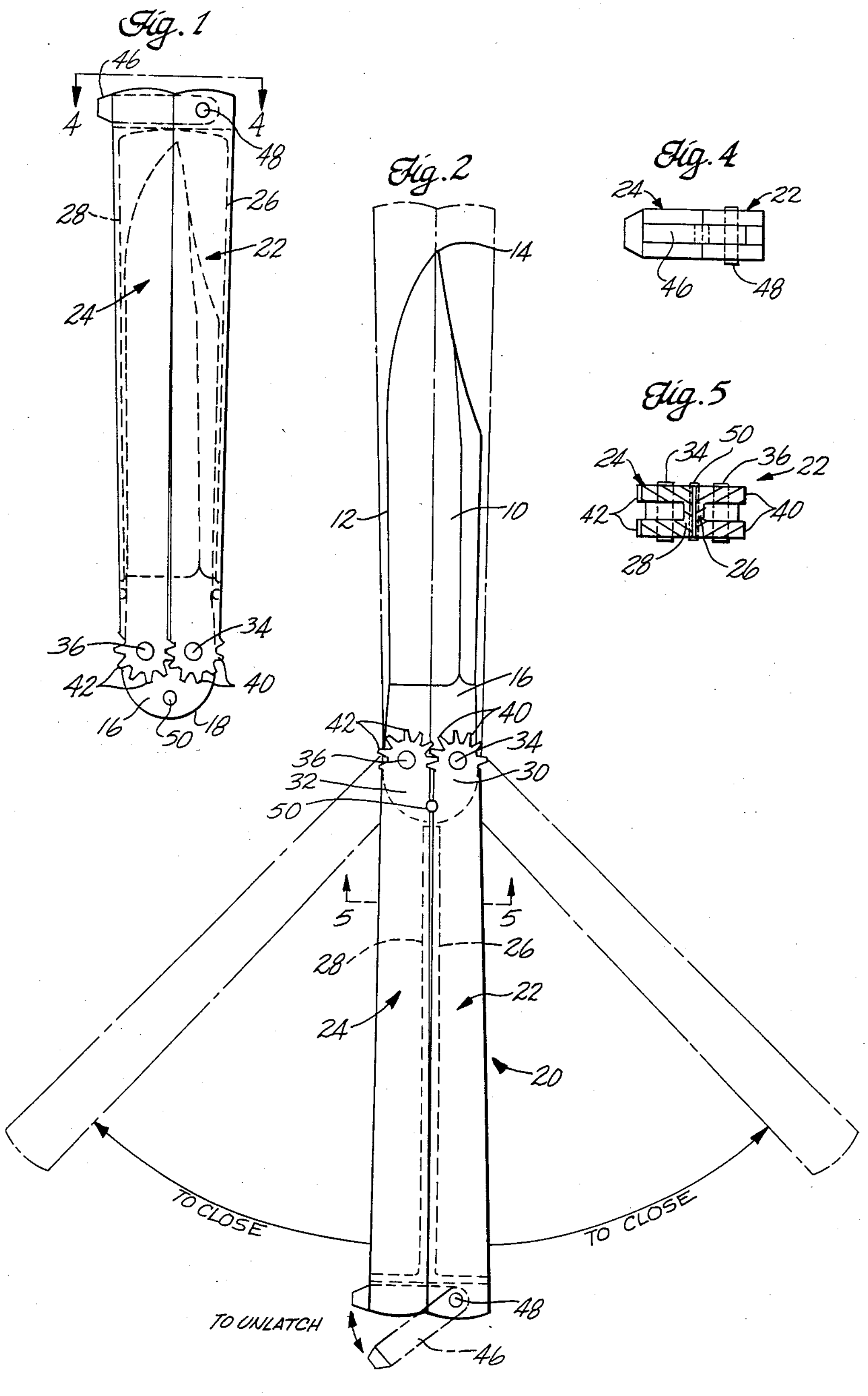
FIG. 1 is a side view of the knife in the closed or folded position.
FIG. 2 is a side view of the same knife in the open or operative position.
FIG. 4 is an end view of one end of the knife in the folded position.
FIG. 5 is an end view of the opposite end of the knife in the folded position.
Figure 3:
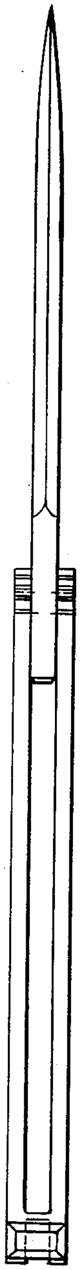
FIG. 3 is an edge view of the knife in the open position.

Referring to the drawings in detail, the knife of the present invention includes a blade 10 having a cutting edge 12. The blade is elongated and preferably terminates at one end in an outer point 14 and at the other end in a shank portion 16 of substantially uniform cross-sectional thickness and rounded to form a semicircular end 18. A handle 20 consists of two rotatable sections 22 and 24. Each of the handle sections is channel shaped to provide a pair of parallel side walls joined by a bottom wall, as best seen in the crosssectional view of FIG. 5. Each of the bottom walls, indicated respectively at 26 and 28, terminates short of the side walls to form a bifurcated ends 30 and 32, respectively, on each of the handle sections. The bifurcated ends receive the shank portion 16 of the blade and are pivotally joined to the blade by a pair of hinge pins 34 and 36.

The bifurcated ends 30 and 32 of the two handles are provided with gear sectors centered about the pivot axis of the pins 34 and 36 and with intermeshing gear teeth 40 and 42. The intermeshing gear sectors on the ends of the respective handle sections interlocks or synchronizes the relative rotation of the two handle segments in relation to the knife blade 10. Thus rotation of either handle section relative to the knife blade causes an equal and opposite amount of rotation of the other handle segment relative to the knife blade. Thus the axis of the knife blade always bisects the angle between the two rotating handle segments as they are rotated from the open position shown in FIG. 2 to the closed position shown in FIG. 1. Thus when rotated to the fully open position, both handle sections 22 and 24 are axially aligned with the blade 10. Similarly, when rotated to the fully closed position, as shown in FIG. 1, the handle sections, due to their channel shape, fit around and fully enclose the knife blade 10.

Optionally, to lock the knife in either its fully closed or fully open position, the outer ends of the handle sections are bifurcated to receive a T-shaped latch member 46. The stem portion of the T-shaped latch member is pivotally secured to the handle section 22 by a pivot pin 48. The latch member 46 locks the outer ends of the handle sections together in either the open or closed positions by rotating the latch member so that the cross portion of the T-latch engages the bifurcated end of the handle section 24. It will be noted that the latch member 46 must be rotated through 180° to move from the locking position with the handle open to the locking position with the handle closed. An optional alignment pin 50 may be provided which projects from either side of the shank portion 16 of the knife blade 10 and is engaged by notches in the handle sections 22 and 24 when in the fully open position. While the pin 50 is not essential with the meshing gear sectors, it does provide additional strength in maintaining alignment between the handle sections and the blade when in the fully open position, and adding additional rigidity to the connection between the handle sections and the blade.

It will be noted that the intermeshing gear sectors on the inner ends of the handle sections provide a number of advantages in addition to synchronizing the movement of the two handle sections. For instance, it will be seen that when the handle sections are moved to the closed position, the bottom wall 28 of the handle section will not come in contact with the knife edge 12 of the blade because the intermeshing gears cause the handle section 24 to first come in contact with the other handle section 22. Thus the knife edge is protected against impact with the handle even though the handle sections fully enclose the blade in the closed position. In this way the cutting edge of the blade is protected against any impact with its enclosing handle which would tend to dull or damage the cutting edge. Also, because the gear teeth must project beyond the margins of the handle to allow them to intermesh, they form a natural serration across the ends of the knife handle which tend to prevent the user's fingers from slipping along the handle into contact with the cutting edge of the blade when using the knife. Thus they serve as hand guards. The result is a knife which is improved both in utility and in safety.

What is claimed is:

1. A knife comprising:

an elongated blade having a shank portion at one end, first and second elongated channel-shaped handles, having two parallel spaced side walls and a connecting outer edge wall, the side walls of each channel-shaped handle extending beyond one end of the connecting outer edge wall to form a clevis into which the shank portion of the blade extends, a pair of hinge pins extending through the clevis portion of the respective handles and through the shank portion of the blade to pivotally secure each of the handles to the blade, the two side walls of each channel-shaped handle at the clevis portion being rounded at the outer end in a radius about the respective hinge pins, and gear teeth projecting radially from the two rounded sides of each handle, the projecting teeth from the two sides of one handle meshing with the teeth from the two sides of the other handle, whereby rotation of one handle drives the other handle in the opposite direction of rotation relative to the blade, the gear teeth projecting radially outwardly beyond the margins of the respective handles when the handles are rotated to the fully open position with said connecting edge walls in abutting relationship, whereby the gear teeth are exposed and provide a better grip of the handles.

2. Apparatus of claim 1 wherein the blade width is less than twice the inside depth of the channel-shaped handles, whereby the blade does not touch the bottom of the channel when the handles are rotated to the closed position.

* * * * *